(12) United States Patent
Noirot-Nerin

(10) Patent No.: US 9,111,284 B2
(45) Date of Patent: Aug. 18, 2015

(54) MAINTAINING A HISTORY OF QUERY RESULTS

(75) Inventor: Francois Noirot-Nerin, Saint-Cloud (FR)

(73) Assignee: Google Inc., Mountain View, CA (US)

( * ) Notice: Subject to any disclaimer, the term of this patent is extended or adjusted under 35 U.S.C. 154(b) by 1010 days.

(21) Appl. No.: 11/569,336

(22) PCT Filed: May 21, 2004

(86) PCT No.: PCT/IB2004/001923
§ 371 (c)(1),
(2), (4) Date: Mar. 29, 2007

(87) PCT Pub. No.: WO2005/114508
PCT Pub. Date: Dec. 1, 2005

(65) Prior Publication Data
US 2007/0219962 A1  Sep. 20, 2007

(51) Int. Cl.
*G06F 17/30* (2006.01)
*G06Q 30/02* (2012.01)

(52) U.S. Cl.
CPC ........................ *G06Q 30/02* (2013.01)

(58) Field of Classification Search
CPC ............. G06F 17/30371; G06F 17/30404; G06F 17/3056; G06F 17/30578; G06Q 30/02; G06Q 50/18; G06Q 10/087
USPC ................... 707/722, 723, 728, 731
See application file for complete search history.

(56) References Cited

U.S. PATENT DOCUMENTS

| | | | |
|---|---|---|---|
| 5,794,246 A | 8/1998 | Sankaran et al. | |
| 5,924,090 A * | 7/1999 | Krellenstein | 707/5 |
| 6,006,225 A | 12/1999 | Bowman et al. | 707/5 |
| 6,317,722 B1 * | 11/2001 | Jacobi et al. | 705/14 |
| 6,484,162 B1 * | 11/2002 | Edlund et al. | 707/3 |
| 6,581,068 B1 * | 6/2003 | Bensoussan et al. | 707/104.1 |
| 6,640,218 B1 * | 10/2003 | Golding et al. | 707/2 |
| 6,732,088 B1 * | 5/2004 | Glance | 707/3 |
| 6,832,218 B1 * | 12/2004 | Emens et al. | 707/3 |
| 7,281,008 B1 * | 10/2007 | Lawrence et al. | 707/7 |
| 2001/0028603 A1 | 10/2001 | Shimazu | 368/10 |
| 2002/0073167 A1* | 6/2002 | Powell et al. | 709/217 |
| 2002/0077901 A1 | 6/2002 | Katz | 705/14 |

(Continued)

FOREIGN PATENT DOCUMENTS

| | | |
|---|---|---|
| EP | 1 324 250 A | 7/1999 |
| EP | 1338974 | 2/2004 |

OTHER PUBLICATIONS

International Search Report for International Application No. PCT/IB2004/001923.

(Continued)

*Primary Examiner* — Dinku Gebresenbet
(74) *Attorney, Agent, or Firm* — Finnegan, Henderson, Farabow, Garrett & Dunner, LLP

(57) ABSTRACT

A method and system for maintaining history of query results is provided. In one aspect, a query and corresponding results retrieved for providing to the requestor are intercepted and saved. Related information about the query and the results are gathered and saved with the query and the results. The saved information may be filtered, consolidated, or otherwise processed and stored in a query storage. The saved information may be queried and be the basis of information from which results to other queries are obtained.

20 Claims, 4 Drawing Sheets

(56) References Cited

U.S. PATENT DOCUMENTS

| | | | | |
|---|---|---|---|---|
| 2002/0184111 | A1* | 12/2002 | Swanson | 705/26 |
| 2005/0044064 | A1* | 2/2005 | Haase | 707/3 |
| 2005/0159974 | A1* | 7/2005 | Moss et al. | 705/1 |
| 2007/0033154 | A1* | 2/2007 | Trainum et al. | 707/1 |

OTHER PUBLICATIONS

*European Patent Office; Communication Pursuant to Article 94(3) EPC* for No. 04 734 329.8-1527, Ref. J00046646EP, 4 pages, Jan. 15, 2010.
European Patent Office, Board of Appeal, Decision in App. No. 04734329M, Dec. 12, 2014 (36 pages).
European Patent Office, Board of Appeal, Summons to Oral Proceedings in App. No. 04734329.8, May 19, 2014 (52 pages).
European Patent Office, Brief Communication in App. No. 04734329.8, Feb. 22, 2013 (8 pages).
European Patent Office, Copy of the Minutes in App. No. 04734329.8, Mar. 19, 2013 (4 pages).
European Patent Office, Decision to Refuse a European Patent Application in App. No. 04734329.8, Mar. 19, 2013 (27 pages).
Grounds of Appeal in App. No. 04734329.8, Jul. 29, 2013 (44 pages).
Surajit Chauduri and Umeshwar Date Unknown, An Overview of Data Warehousing and OLAP Technology, Date Unknown (10 pages).
Henry G. Goldberg and Ted E. Senator, Restructuring Databases for Knowledge Discovery by Consolidation and Link Formation, 1995 (5 pages).
Daniel L. Moody and Mark A.R. Kortink, From Enterprise Models to Dimensional Models: A Methodology for Data Warehouse and Data Mart Design, 2000 (12 pages).

* cited by examiner

MAINTAINING A HISTORY OF QUERY RESULTS

CROSS-REFERENCE TO RELATED APPLICATION

This application claims priority to PCT/IB2004/001923, entitled Maintaining a History of Query Results, filed May 21, 2004.

TECHNICAL FIELD OF THE INVENTION

This application relates to maintaining information associated with queries performed through a querying system or application.

BACKGROUND OF THE INVENTION

Searches for information may be performed using various applications and search engines. For instance, a myriad of search engines are currently available to Internet users for looking up information on the Internet. Numerous businesses offer applications and user interfaces such as the World Wide Web pages to help customers and visitors to look up information about their businesses. Other applications offer various user interfaces that allow searching for information.

To search for information, a query is typically entered on the various user interfaces described above. The query may take the form of keywords or search terms and/or search arguments. The query may also be in natural language such as "What's the weather today?"

The search engines and applications accept these queries, search for the information requested in the query in various databases and storages and provide the results of the queries to the users. In the process of accepting the queries and providing the results to the queries, a huge amount of information can be gathered about the queries and the results. The gathered information in turn may be used to gain insight and patterns in various user behaviors.

SUMMARY OF THE INVENTION

A method and system for maintaining history of queries and results is provided. The method in one aspect includes receiving a query and retrieving one or more results of the query. Context information about the query is gathered and data about the query, the one or more results of the query, or the context information, or combination thereof, is stored.

The method in another aspect includes filtering the query data and storing the filtered query data. In this aspect, a query and one or more results of the query are received. Context information associated with the query and the one or more results is gathered. The query, the one or more results of the query, or the context information, or combination thereof is filtered and the filtered query data is stored.

The method in yet another aspect includes consolidating the query data and storing the consolidated query data. In this aspect, a query and one or more results of the query are received. Context information about the query is gathered. A determination is made as to whether the query was previously performed, and if the query was previously performed, the query, the one or more results of the query, or the context information, or combination thereof is consolidated into consolidated query data. In this aspect, only the consolidated information may be stored if the same query data was stored previously.

The system in one aspect includes a query module operable to receive a query from an end user and return one or more results to the end user, and a storage module operable to intercept the query and the one or more results from the query module. The storage module is further operable to store the query, the one or more results, context information associated with the query, or combination thereof, in a query storage module.

The system in another aspect may include a filter module operable to filter the intercepted query, the one or more results, and the query context information. In this aspect, the storage module stores the filtered data in the query storage module.

The system in yet another aspect may include a consolidation module operable to determine whether the intercepted query was received previously, and if the intercepted query was received previously, the consolidation module is operable to update the data related to the intercepted query such as the number of times the query was performed during certain time interval. In this aspect, the storage module may store the updated data in the query storage module without storing the same query and the results again.

Further features as well as the structure and operation of various embodiments are described in detail below with reference to the accompanying drawings. In the drawings, like reference numbers indicate identical or functionally similar elements.

DETAILED DESCRIPTION OF THE INVENTION

Figure 1:
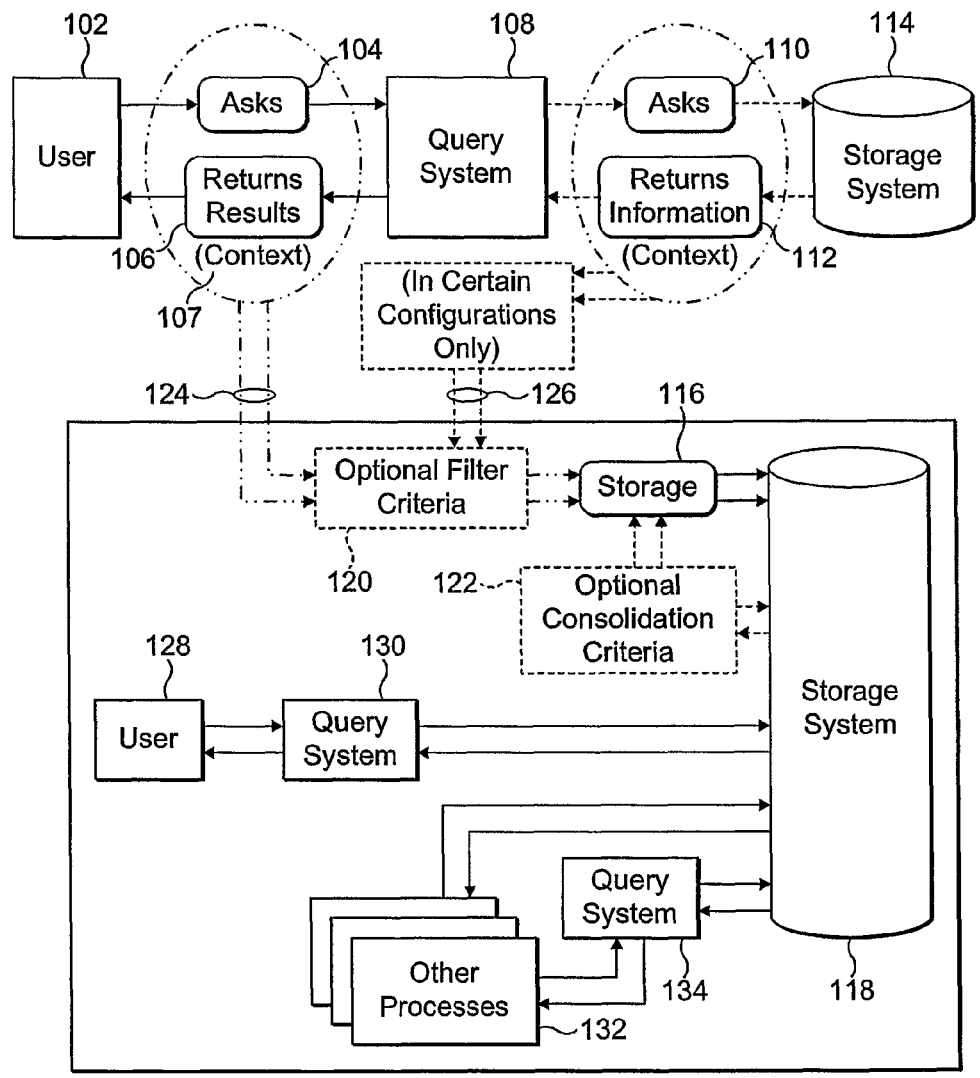
FIG. 1 is a diagram illustrating the query data collection in one embodiment.

FIG. 1 is a block diagram illustrating the components for maintaining history of query results in one embodiment. A user 102 requests for information as shown at 104, for example, from a query system 108. One role of the query system 108 is to return the information 106 to the user 102. For example, a user 102 may query or ask for stores that are selling a certain product ABC, prices for the product, and estimated delivery dates. In response to the user's request, the query system 108 may return the information requested as a result. Examples of the returned result may include: shop 1 sells product ABC at price $100, estimated delivery date is in 2 days, etc.

Queries in another aspect may include a process of an action for which information is typically returned. For example, a query may include an action of ordering a product (ABC) and including a shipping address and specifying a method of payment. In this case, a corresponding query result may include the action of accepting the order and providing shipment date confirmation, or not accepting the order and providing a reason (XYZ) not the non-acceptance.

Typically, when a query system 108 receives a query from a user 102, the query system 108 retrieves the information from a storage system 114. For example, the query system 108 requests as shown at 110 for the information it needs from the storage system 114. In other cases, the query system 108 may have its own cache memory for storing the information.

In these cases, the query system 108 may not request each time the information from the storage system 114. The query system 108 may, for example, fetch the information one time and keep the information in its own memory for a predetermined amount of time. Either way, regardless of whether the information was already available in the query system 108 or the query system 108 retrieved it from the storage system 114 via 112, the retrieved information is then returned to the user at 106. For retrieving information from the storage system 114, the query system 108 may further format the query into a form understandable by the storage system 114.

Thus, the requests made at 104 and 110 may or may not have one-to-one mapping. For example, even if the user 102 makes a request at 104, the query system 108 may not make the corresponding request at 110. For instance, if the query system 108 has its own memory or cache or other capability to store previously requested information, the query system 108 may not need to further make a request to the storage system 114 for the information.

Various information about the user's query, such as the query itself 104, returned results 106, and the context information 107 are intercepted as shown at 124 (or 126) and stored as shown at 116 in the storage system 118. In one aspect, the information 104 and 106 and 107 may be filtered as desired as shown at 120, using the filter criteria. Thus, in one aspect, not all information from the query and subsequent returned result need to be stored. Examples of filter criteria include selecting information about certain products or types of products, selecting information about the shops that sell certain products or types of products, or selecting only first 20 returned results, etc.

Further, the information 104 and 106 and 107 may be stored under a consolidated form as shown at 122, or under a consolidated and unconsolidated form. For example, if the same query was performed many times a day, and the same result was provided for each of the same query, the multiple queries and results may be stored only once with a counter or flag that indicates how many times this query and corresponding result has occurred (e.g. in a day or in some other given time period). Thus, after a query and a corresponding result is stored the first time, subsequent queries and results that are the same as the previous one need not be stored again, but only have its counter incremented. Other information such as the times of the day the queries were performed may be updated or stored in such cases. Thus, although the query and its results may be stored once, each time the query is performed, that time is recorded and stored with any other context information in one embodiment.

In another aspect, for the queries to be consolidated, the queries need not be strictly identical. For example, queries having a selected number of common elements may be grouped together. In the below example of four queries:

Query 1: asked for product P1, color RED
Result 1: 32 offers returned
Query 2: asked for product P1, color GREEN
Result 2: 12 offers returned
Query 3: asked for product P2, color YELLOW
Result 3: 245 offers returned
Query 4: asked for product P2, color BLUE
Result 4: 34 offers returned, all four queries are different. However, queries 1 and 2 may be grouped based on the commonality of product P1 and the criteria that a color was specified, regardless of which color. Similarly, queries 3 and 4 may be grouped based on the commonality of product P2 and the criteria that a color was specified, regardless of which color. Thus, queries may be grouped or consolidated based on a selected common criteria.

The stored information then may be made available to interested users and processes as will be described herein below. The storing of query information may take place at the user query level 104 via the path 124 as shown. Alternatively, the storing of query information may take place at the query system level 110 as shown at path 126. The storage of query information may take place via this path 126, for instance, if there is a one-to-one mapping equivalent between the queries performed at 104 and the queries performed at 110. The one-to-one mapping equivalent may be found, for example, where the query system at 104 has no caching logic or uses a caching logic that is included within the storage system.

The information stored at 116 may be any information about the context of the query including, but not limited to, information about the user 102 such as cookies or profiles related to the user 102, the timestamp of the initial request, time zone information, etc. The information stored at 116 may also be about the query such as the definition of the query, that is, the query itself; the tool used for the query, for example, a world wide web page interface or a form used to input the query information and the values entered by the user on different fields of the form used for the query. If the tool used for the query was prompting for an SQL query (Structured Query Language), the text of that query and related information such as where the results are to be fetched may be included.

The information stored at 116 may also be any information about the returned results, including but not limited to, the data, the order and timestamp in which the results were returned, whether the return of results has been interrupted and if so, whether the interruption was by the user or the query system, whether the user viewed all the returned results, the results the user viewed, and the time when the user viewed particular results, which results were viewed more than once, etc.

The information stored about the query may be the query data themselves, statistics about the query, amount of time it took to retrieve the results, or groupings (consolidations). Statistics about the query may include maximum, minimum, and/or average values of returned information, for example, if a query returned price results for a certain item, then maximum, minimum, and average price information. Other statistics may include, for example, maximum, minimum, and average price information gathered over a number of queries, over all queries performed during a calendar month, etc.

A user at 128 may use a query system 130 to extract the information stored in the storage system 118, for example, a query storage system that stores the data about the queries performed. Other processes 132 may also use a query system 134 to retrieve the information stored in the storage system 118. Other processes 132 may include a process that automatically updates product prices, depending on information it finds from the stored queries and related information. The user at 128, for example, may query the storage system 118 for information about queries where the user's name or company or products shipped by the user's company may be involved, either as search criteria or as part of the result of past queries. The storage systems described herein 114, 118, may include any known storage systems for storing data, such as conventional database systems.

Figure 2A:
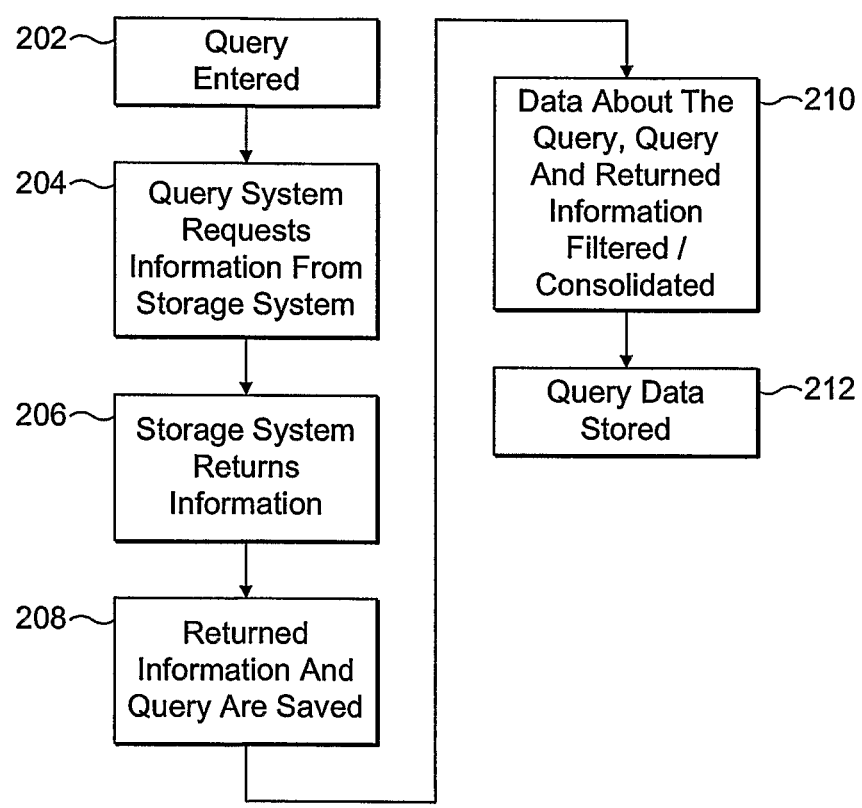
FIG. 2A is a flow diagram illustrating the method of storing query information in one embodiment.

FIG. 2A is a flow diagram illustrating the method of storing query information in one embodiment. At 202, a user or an automatic process requests a query, for instance, to retrieve information. Examples of query entry include, but are not limited to, entering keywords on user interfaces provided on the World Wide Web such as the search engine web pages and particular vendor's web pages. Queries may also be in the form of structured query language (SQL) or natural languages. For example, a query process may translate a user entered query into an SQL query, or a process run as a part of an application program may request a query in a form of SQL.

At 204, a query system receives the user's query and requests the information asked in the query from an appropriate information storage system. If the query system has memory capabilities, the query system may already have requested the information from the information storage system, and provides the information to the user without requesting again the information from the storage system.

At 206, the storage system retrieves the information requested and returns to the query system, for example, if the query system requested the information. The storage system may be a database system. At 208, the information returned to the query system, the query, and other data about the query are saved. This returned information, the query, and other data may be filtered as desired and consolidated as shown at 210. The information returned to the query system, the query, other data about the query are stored, and any other data or information resulting from the filtering and/or consolidation steps are stored in a storage system. In another aspect, filtering and/or consolidation may be performed after the entire query information is first stored.

Figure 2B:
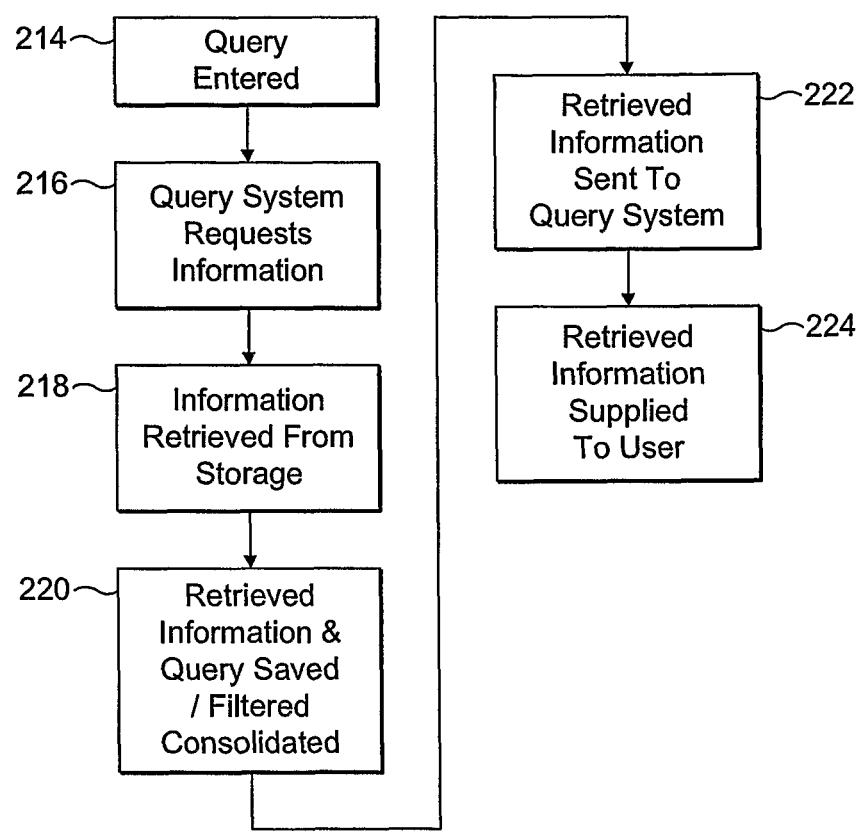
FIG. 2B is a flow diagram illustrating the method of storing the query information in another embodiment.

FIG. 2B is a flow diagram illustrating the method of storing the query information in another embodiment. At 214, a user looking for information enters a query in a similar manner described with respect to FIG. 2A. At 216, the query system receives the query from the user. At 218, information is retrieved from a storage system. The storage system, for example, may be a database system. At 220, the retrieved information is saved along with the query and other data about the query. The saved query information may be further filtered and/or consolidated. At 222, the retrieved information is also returned to the query system. At 224, the query system provides the retrieved information to the user.

Figure 3:
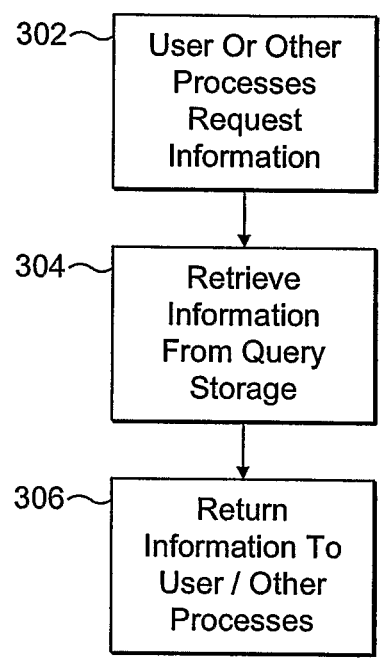
FIG. 3 is a flow diagram illustrating the method of querying the stored query information in one embodiment.

FIG. 3 is a flow diagram illustrating the method of querying the stored query information in one embodiment. The saved data about the query, for example, the query, the returned result, and other context data about the query, filtered and/or consolidated query information may be used to mine for various purposes, including business promotion and improvement purposes. The data saved, for instance, according to the embodiments described with references to FIGS. 2A and 2B, may be stored in a separate storage system (118 FIG. 1). At 302, a user interested in various aspects of query data may request information related to the saved query information. At 304, the information is retrieved and at 306 the retrieved information is provided to the user. In addition to or alternatively, processes may automatically request information related to the saved query data. These processes may include processes that generate various reports on the saved queries, processes that automatically update prices, depending on certain criteria including information about the queries, their results and other related information. Other processes may include processes that propose to add products with certain characteristics to the offers of a company, etc.

The stored queries may also be used to analyze user needs and make business decisions based on those user needs. For instance, from the stored query data, it may be determined that a typical users of certain demographics desire certain products or services at a certain price. Businesses can thus use the query data to cater to their customers more productively and efficiently. Other data mining may be performed using the stored query data.

The system and method of the present disclosure may be implemented and run on a general-purpose computer. The embodiments described above are illustrative examples and it should not be construed that the present invention is limited to these particular embodiments. Thus, various changes and modifications may be effected by one skilled in the art without departing from the spirit or scope of the invention as defined in the appended claims.

The invention claimed is:

1. A method of maintaining a history of query results in a first storage system, the method comprising the following operations performed by one or more processors:
   detecting a query submitted by a first device, the query requesting information from a second storage system associated with a second device;
   detecting one or more results of the query provided by the second device, the results based on data stored in the second storage system;
   automatically filtering, based on filter criteria, the detected results to select a portion of the results that satisfies the filter criteria;
   determining that at least a portion of the query was previously performed based on a comparison between search criteria included in the query and a previously detected query stored in a cache memory of the first device;
   in response to each determination that the query was previously performed, determining that the results of the query are generally the same as the results of the previously performed query; and
   in response to each determination that the results of the query are generally the same as the results of the previously performed query, updating consolidated query data stored in association with the previously detected query such that the updated consolidated query data comprises one or more results of the query and the results of the previously performed query, without storing the query.

2. The method of claim 1, wherein the consolidated query data includes a number of times the query was received and a number of times the same result to the query was received.

3. The method of claim 1, wherein the method further comprises:
   gathering context information about the query, the context information including a timestamp of the query and being stored in an entry associated with the consolidated query data.

4. The method of claim 1, wherein the method further comprises:
   gathering context information about the query, the context information including one or more results, which the user selected to view from the one or more results of the query.

5. The method of claim 1, wherein the method further comprises querying the stored consolidated query data.

6. A system for maintaining a history of query results in a first storage system, comprising:
   one or more processors;
   memory coupled to the one or more processors and configured to store program instructions executable by the one or more processors to:
   detect a first query submitted by a first device, the first query requesting information about a first product from a second storage system associated with a second device;
   store the detected first query in a cache memory of the first device included in the first storage system;
   detect one or more results of the first query provided by the second device, the results based on data stored in the second storage system;

automatically filter, based on filter criteria, the detected one or more results to select a portion of data associated with the certain product or type of product that satisfies the filter criteria;

store in the cache memory of the first device an entry, the entry comprising the portion of the data associated with the certain product or type of product that satisfies the filter criteria;

detect a second query requesting information about a second product;

determine that at least a portion of the second query was previously performed based on a comparison between search criteria included in the second query and the detected first query stored in the cache memory;

receive one or more results of the second query;

determine that the one or more results of the first query are the same as the one or more results of the second query; and in response to each determination that the results of the first query are the same as the results of the second query, update consolidated query data stored in association with the first query such that the updated consolidated query data comprises the results of the first query and the results of the second query, without storing the second query.

7. The system of claim 6, wherein the one or more processors are further configured to:

receive filter criteria to be applied to at least one of the one or more results the first query and the second query;

filter the data associated with the one or more results associated with the first query and the data associated with the one or more results associated with the second query based on the filter criteria; and store only the filtered data associated with the first and second results in the consolidated query data stored in association with the first query.

8. The system of claim 6, wherein the one or more processors are further configured to determine one or more values based on the data associated with the first query result and the data associated with the second query result, and wherein the one or more values comprise a minimum and a maximum price of a product, wherein the product is a portion of the data in the first query.

9. The system of claim 6, wherein the one or more processors are further configured to determine and store a number of times the first query was received, and a number of times the same one or more results of the first query were received.

10. The system of claim 6, wherein the first query is related to a product and wherein the one or more processors are further configured to:

receive a filter criteria associated with the results of a query search, the filter criteria associated with the product;

extract data associated with a price of the product from the data associated with the one or more results associated with the first query and the data associated with the one or more results associated with the second query based on filter criteria;

store the extracted data associated with the price of the product in the consolidated query data stored in association with the first query; and determine an average price of the product based on the extracted data associated with the price of the product.

11. The method of claim 1, wherein the method further comprises storing the context information in the consolidated query data stored in association with the previously detected query.

12. The method of claim 11, wherein the context information comprises information about a user that submitted the query.

13. The method of claim 12, wherein the context information further comprises information regarding which of the results were viewed by the user.

14. A method of maintaining a history of query results, the method comprising the following operations performed by one or more processors:

detecting a first query submitted by a first device, the query requesting information from a query system associated with a second device;

storing the detected first query in a cache memory of the first device;

detecting a first set of search results provided by the query system in response to the submitted first query;

storing the detected first set of search results in the cache memory of the first device;

detecting a second query submitted by the first device, the query requesting information from the query system;

determining that at least a portion of the second query matches the detected first query stored in the cache memory; and providing a second set of search results in response to each submitted second query, the provided second set of search results based on the detected first set of search results stored in the cache memory of the first device.

15. The method of claim 14, further comprising storing context information associated with the first query in the cache memory of the first device.

16. The method of claim 15, wherein the stored context information includes profile information associated with a user submitting the first query.

17. The method of claim 15, wherein the stored context information includes a time at which a user viewed the provided first set of search results.

18. The method of claim 15, wherein the stored context information includes an indication of which results were viewed more than once by a user.

19. The method of claim 15, wherein the stored context information includes an amount of time required to retrieve the first set of search results.

20. The method of claim 15, wherein the stored context information includes time zone information associated with the first device.

* * * * *